Aug. 23, 1966  G. KIPER  3,267,829
CENTRAL PHOTOGRAPHIC SHUTTER
Filed Feb. 20, 1964  2 Sheets-Sheet 1

INVENTOR.

GERD KIPER

United States Patent Office
3,267,829
Patented August 23, 1966

3,267,829
CENTRAL PHOTOGRAPHIC SHUTTER
Gerd Kiper, Unterhaching, near Munich, Germany, assignor to Agfa Aktiengesellschaft, Leverkusen-Bayerwerk, Germany
Filed Feb. 20, 1964, Ser. No. 346,340
Claims priority, application Germany, Mar. 13, 1963, A 42,575
4 Claims. (Cl. 95—63)

This invention relates to a central photographic shutter in which the shutter sectors are open and closed by changing the angular phase between the pair of concentric rings to which they are operatively connected, and it more particularly relates to such a shutter in which the operating rings commence their driven movement and one of them is retarded to control the shutter opening time and pattern.

In U.S. Patent No. 3,099,197 is shown a central photographic shutter in which the exposure time is effected by retarding one of a pair of simultaneously moving sector rings. In the above patent a retarding device acts upon the shutter closing ring to retard its motion to momentarily vary the angular relationship between it and the shutter-opening ring after they are released. The sectors open while the rings are out of phase and then close when they come back into phase at the end of the movement to provide the desired shutter-opening time. In the aforementioned patent the shutter can be installed in a camera with automatic exposure control and can be optionally constructed as an automatic shutter or a wind-up type shutter in which with similar exposure times only a slight driving force and a slight tension force is necessary. Where desired a lengthening of the exposure time can be obtained by a setting of the diaphragm as compared to the existing exposure time; and conversely a shortening of the exposure time can also be obtained. This time regulation is smoothly accomplished from the shortest to the longest exposure time with the aforementioned shutter.

An object of this invention is to provide a central photographic arrangement of the above type which is particularly effective in accomplishing the above results and in which any need for a separate diaphragm is eliminated.

A further object of this invention is to provide such a simple and economical central photographic shutter in which the shutter opening and exposure time are adjustable.

In accordance with this invention a control element adjusts the angular orientation of the retarding member with respect to the sector operating rings to regulate the time of initiation of the retarded movement of the closing ring, as well as its duration and pattern of retarded movement. For longer exposure times the retarding element is adjusted to contact the closing ring shortly after it is released; and conversely for shorter exposure times the retarding element is adjusted to contact the closing ring after it has already moved a substantial distance.

In an advantageous form of this invention a camming edge on the closing ring contacts one end of a retarding lever. The control element is a control curve cam movably mounted on the housing, which contacts the other end of the lever and a spring maintains the lever and control curve cam in contact with each other. The exposure time is adjusted by moving the control curve cam to pivot the lever closer to or further from the camming edge of the closing ring. A scale and marker may be on the control curve cam and shutter housing to accurately indicate the shutter opening.

In accordance with another aspect of this invention, the retarding element is a ring having a pair of projections. One projection is contacted by the closing ring and the other projection is spring biased against a lug on a concentric control ring. Movement of the control ring thereby adjusts the distance of the projection on the retarding ring from the projection on the closing ring to thus control the exposure time and shutter opening.

Novel features and advantages of the present invention will become apparent to one skilled in the art from a reading of the following description in conjunction with the accompanying drawings wherein similar reference characters refer to similar parts and in which.

Figure 1:
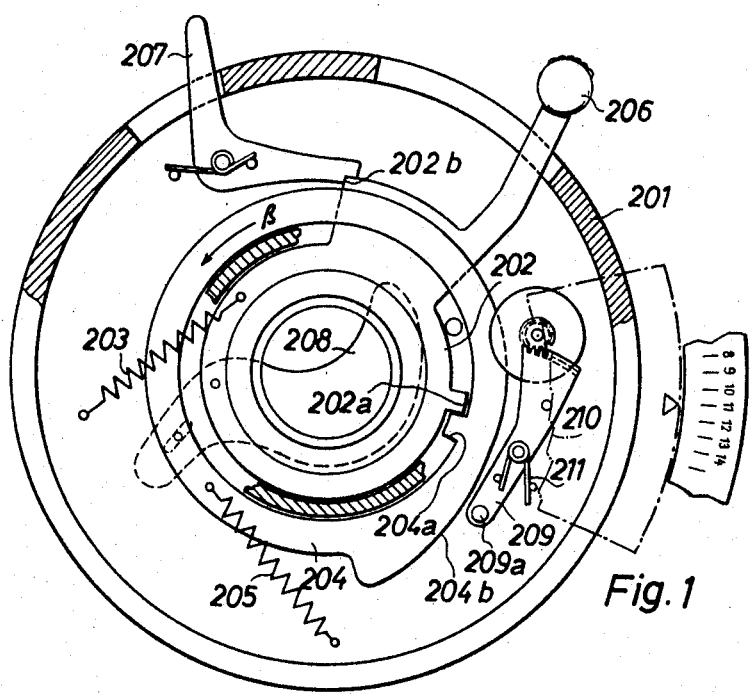
FIG. 1 is a sectional view in elevation taken through a shutter which is one embodiment of this invention.

In FIG. 1 is shown a shutter housing 201 upon which sector operating ring 202 and 204 are concentrically mounted upon opposite sides of annular projections. A number of shutter sectors 208, of which only one is shown for simplicity of presentation, are rotatably connected to rings 202 and 204 by pins in each ring. Ring 202 also includes a radially extending driving projection 202a, while a driving spring 203 of the tension type reacts between ring 202 and a portion of housing 201. Ring 204 includes an inwardly extending lug 204a which engages driving projection 202a upon ring 202. Driving spring 205 of the tension type also reacts between ring 204 and the stationary portion of housing 201. A pin 209a on retarding lever 209 is in the path of movement of camming edge 204b on closing ring 204 to reduce the angular velocity of closing ring 204 when camming edge 204a contacts pin 209a to rotate lever 209 against the action of spring 211. Spring 211 also maintains another pin on lever 209 in contact with time control curve cam or control ring 210 mounted concentrically with rings 202 and 204. The position of lever 209 with respect to projection or camming edge 204b is thereby determined by control curve cam 210. When control curve cam 210 is rotated counterclockwise, pin 209a is moved closer to camming edge 204b and thus contacts it shortly after ring 204 is released to obtain a greater exposure time and larger shutter opening. Conversely control curve cam 210 is rotated clockwise for a shorter exposure time and smaller shutter opening. Camming edge 204b may be shaped to rotate past pin 209a before lug 204a contacts projection 202a so that ring 204 moves a short distance unretarded. Winding or tensioning lever 206 connected to ring 202 extends through the side of shutter housing 201 for movement between a pair of motion limiting surfaces. When lever 206 is moved clockwise to the position shown in FIG. 1, driving springs 205 and 203 are tensioned. When the lever is in the position shown in FIG. 1 an edge 202b of sector control ring 202 is engaged by lever 207 which is held in the engaged position under spring action.

Figure 4:
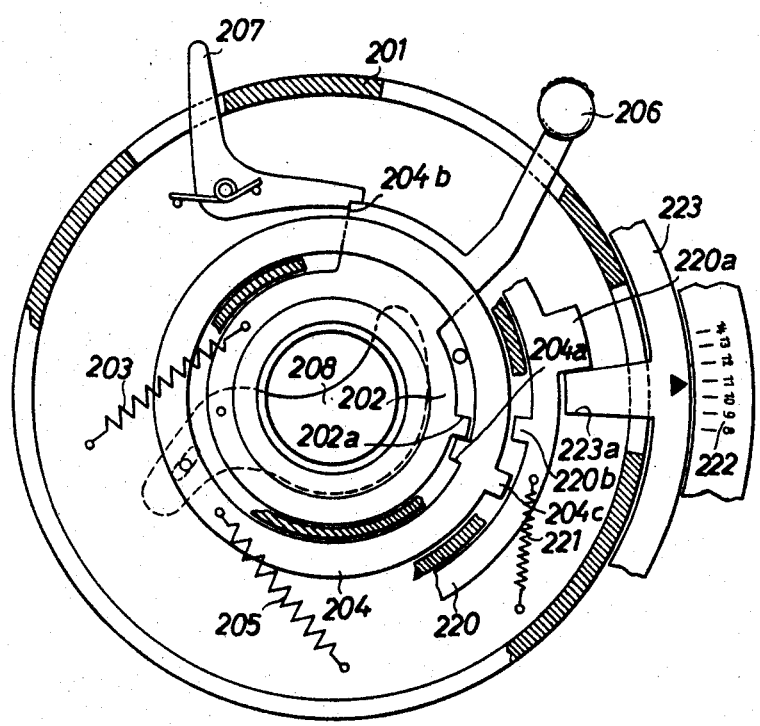
FIG. 4 is a sectional view in elevation taken through a shutter which is another embodiment of this invention.

FIG. 4 shows another embodiment of this invention. Ring 204 has a projection 204c which contacts a lug or projection 220b on concentric retarding ring 220. Spring 221 maintains another projection 220a in contact with lug 223a on concentric control ring 223, so that the movement of control ring 223 adjusts the position of projection 220b to determine how soon projection 204c and 220b contact each other after ring 204 is released. Light value scale 222 indicates the starting time of retarded motion in terms of the shutter opening or exposure time in accordance with the position of control ring 223.

In another form of the invention projection 220b is replaced by a retarding lever and control curve arrangement (not shown) similar to lever 209 and control curve cam 210 so that projection 204c can rotate past the lever before lug 204a contacts projection 202a to again move unretardedly. Thus the length of retarded motion is adjustable independently of its starting time.

OPERATION

The shutter is wound or tensioned by rotating tensioning lever 206 clockwise as shown in FIGS. 1 and 4 to tension driving spring 203. Driving projection 202a on ring 202 also moves lug 204a clockwise to simultaneously tension driving spring 205 of ring 204. As lever 206 approaches the position shown in FIGS. 1 and 4 lever 207 engages edge 202b to latch the rings in the cocked condition against the tension of the driving springs. Control ring 210 or control ring 223 is then moved until the marker is at the desired value on scale 222 to thereby control the exposure time and the shutter opening. When the end of lever 207 which projects through housing 201 is depressed, edge 202b is released thereby permitting driving springs 203 and 205 to move rings 202 and 204, respectively, in the counterclockwise direction. Closing ring 204 moves freely until edge 204b contacts pin 209a or until projection 204c contacts lug 220b. Closing ring 204, then moves at a retarded or slower angular velocity than ring 202 since it must also drive retarding element 209 or 220. When ring 204 moves at this slower velocity it is out of angular phase with ring 202 and remains out of angular phase until lug 204a contacts projection 202a after ring 202 has stopped moving.

As is readily apparent manually accessible control ring 210 or 223 conveniently regulates the start of retarded movement of closing ring 204, as well as its duration and pattern of retarded movement.

Figure 2:
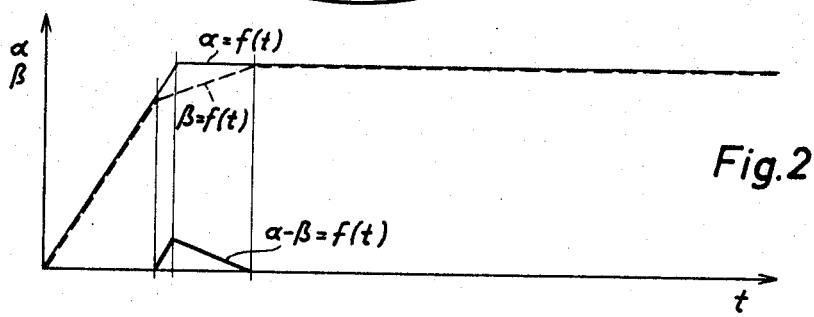
FIGS. 2 and 3 are diagrams showing the relative angular phases of the opening and closing sector rings with shorter and longer distances of travel respectively.
Figure 3:
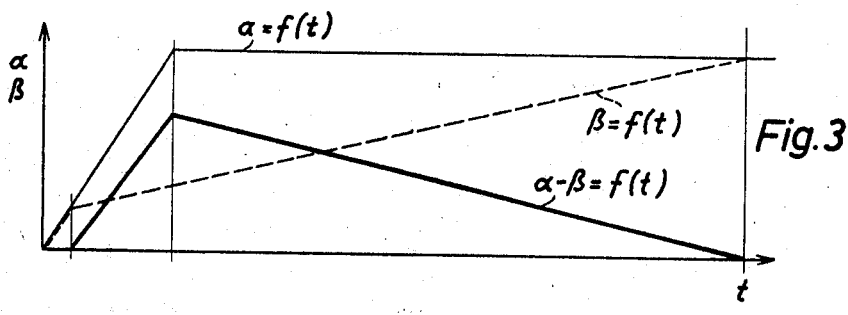

FIGS. 2 and 3 indicate the relative shutter opening and exposure time in accordance with the setting of control ring 210 or 223. In FIGS. 2 and 3 the abscissa indicates the time of travel $t$ of each ring while the ordinate indicates the angular phase $\alpha$ and $\beta$ of rings 202 and 204, respectively. The dotted horizontal line in each figure indicates the angle when each ring has travelled its full distance. As is readily apparent, the sector opening $(\alpha - \beta)$ is zero at the beginning of travel when ring 204 moves unretarded. When ring 204 contacts the retarding element 209 or 220 the rings begin to be out of phase and the sector opening $(\alpha - \beta)$ is greatest when $\alpha$ first reaches the horizontal dotted line. The sector opening then diminishes to zero when $\beta$ reaches the horizontal dotted line. FIG. 2 shows the relatively shorter exposure time and smaller shutter opening when control ring 210 or 223 is at a lower setting on scale 222 than the setting for FIG. 3.

What is claimed is:

1. A photographic shutter of the central type comprising a housing, a pair of rotatably mounted concentric sector operating rings in said housing, a number of shutter sectors, each of said sectors being movably connected to both of said rings to cause them to open and close said sectors when the angular phase between said rings varies from the normal conditions and returns to it, driving means connected to each of said rings for imparting separate driving forces to them, releasing means connected to said rings to cause said rings to commence their driven movement, retarding means on said housing for reducing the angular velocity of one of said sector operating rings whereby the angular phase between said sector operating rings varies from said normal condition, control means on said housing for regulating the time of initiation and the duration of retarded movement of said one sector operating ring whereby the shutter opening and exposure time may be controllably varied, a projection being on one of said sector operating rings, said retarding means comprising a retarding element in the path of motion of said projection, said control means adjusting the angular orientation of said retarding element with respect to said rings in their unreleased condition whereby the starting time and duration of retarded movement are varied, wherein said projection being a camming edge on said one sector operating ring, said retarding element being a lever, and pivot means connected to said lever whereby said lever rotates toward and away from said camming edge.

2. A photographic shutter as set forth in claim 1 wherein said control means comprises a control curve cam abutting against the end of said lever remote from said camming edge of said ring, movable means mounting said control curve cam on said housing whereby the movement of said control curve cam adjusts the angular orientation of said lever with respect to said camming edge before said rings commence their driven movement.

3. A photographic shutter of the central type comprising a housing, a pair of rotatably mounted concentric sector operating rings in said housing, a number of shutter sectors, each of said sectors being movably connected to both of said rings to cause them to open and close said sectors when the angular phase between said rings varies from the normal conditions and returns to it, driving means connected to each of said rings for imparting separate driving forces to them, releasing means connected to said rings to cause said rings to commence their driven movement, retarding means on said housing for reducing the angular velocity of one of said sector operating rings whereby the angular phase between said sector operating rings varies from said normal condition, control means on said housing for regulating the time of initiation and the duration of retarded movement of said one sector operating ring whereby the shutter opening and exposure time may be controllably varied, a projection being on one of said sector operating rings, said retarding means comprising a retarding element in the path of motion of said projection, said control means adjusting the angular orientation of said retarding element with respect to said rings in their unreleased condition whereby the starting time and duration of retarded movement are varied, wherein said retarding element comprising an adjusting ring mounted concentric with said sector operating rings, and a projection on said adjusting ring being in the path of motion on said one sector operating ring.

4. A photographic shutter as set forth in claim 3 wherein a lug is on said adjusting ring, said control means comprising a movable control ring on said housing and a projection on said movable control ring in contact with said lug.

References Cited by the Examiner

UNITED STATES PATENTS

| | | | |
|---|---|---|---|
| 2,578,604 | 12/1951 | Santoni | 95—63 |
| 2,890,640 | 6/1959 | Noack | 95—63 |
| 3,099,197 | 7/1963 | Kiper | 95—63 |

JOHN M. HORAN, *Primary Examiner.*